US008411784B2

(12) United States Patent
Salim et al.

(10) Patent No.: US 8,411,784 B2
(45) Date of Patent: Apr. 2, 2013

(54) MULTI-CONFIGURATION ADAPTIVE LAYERED STEERED SPACE-TIME CODED SYSTEM AND METHOD

(75) Inventors: Ahmad Suhail Salim, Dhahran (SA); Salam Adel Zummo, Dhahran (SA); Samir Nasser Al-Ghadban, Dhahran (SA)

(73) Assignee: King Fahd University of Petroleum and Minerals, Dharan (SA)

( * ) Notice: Subject to any disclaimer, the term of this patent is extended or adjusted under 35 U.S.C. 154(b) by 366 days.

(21) Appl. No.: 12/805,217

(22) Filed: Jul. 19, 2010

(65) Prior Publication Data

US 2012/0014418 A1   Jan. 19, 2012

(51) Int. Cl.
*H04B 7/02* (2006.01)
*H04L 1/02* (2006.01)

(52) U.S. Cl. .......................... 375/267; 375/259; 375/299

(58) Field of Classification Search .......... 375/259–260, 375/267, 295, 299, 300, 298, 302, 308, 261, 375/268, 271, 279, 219
See application file for complete search history.

(56) References Cited

U.S. PATENT DOCUMENTS

| 2003/0003863 | A1* | 1/2003 | Thielecke et al. | 455/39 |
|---|---|---|---|---|
| 2005/0105631 | A1* | 5/2005 | Giannakis et al. | 375/267 |
| 2005/0130664 | A1* | 6/2005 | Sang et al. | 455/450 |
| 2005/0163041 | A1* | 7/2005 | Ikram et al. | 370/207 |
| 2006/0018415 | A1* | 1/2006 | Jung et al. | 375/347 |
| 2007/0127360 | A1* | 6/2007 | Song et al. | 370/208 |

OTHER PUBLICATIONS

J.L. Huang, S. Signell, *Adaptive MIMO Systems in 2×2 Uncorrelated Rayleigh Fading Channel*, IEEE Proc. WCNC, Hong Kong, 2007.
M. Gheryani, Z. Wu, Y.R. Shayan, *Capacity and Performance of Adaptive MIMO System Based on Beam-Nulling*, Arxiv preprint arXiv:0807.4881, 2008.
T. Mao, M. Motani, STBC-VBLAST for MIMO Wireless Communication Systems, *Conference on Communication*, 2005.
Wolniansky et al., "V-BLAST: An Architecture for Realizing Very High Data Rates Over the Rich-Scattering Wireless Channel", Proc. ISSSE-98, URSI International Symposium (1998), pp. 295-300.

* cited by examiner

*Primary Examiner* — Jean B Corrielus
(74) *Attorney, Agent, or Firm* — Richard C. Litman

(57) ABSTRACT

The multi-configuration adaptive layered steered space-time coded (LSSTC) wireless transmission system utilizes Layered Steered Space-Time Codes (LSSTC), a recently proposed multiple-input multiple-output (MIMO) system that combines the benefits of the vertical Bell Labs space-time (V-BLAST) scheme, space-time block codes (STBC) and beamforming. A multi-configuration transmission scheme based on LSSTC and V-BLAST systems uses threshold-based decision making to change the modulation type and the MIMO transmission scheme in order to optimize error performance.

3 Claims, 3 Drawing Sheets

MULTI-CONFIGURATION ADAPTIVE LAYERED STEERED SPACE-TIME CODED SYSTEM AND METHOD

BACKGROUND OF THE INVENTION

1. Field of the Invention

The present invention relates data transmission methods in a multiple-input, multiple-output (MIMO) wireless transmission system, and particularly to a multi-configuration adaptive layered steered space-time coded (LSSTC) wireless transmission system and method that use threshold-based decision making to change the modulation type and the MIMO transmission scheme in order to optimize error performance.

2. Description of the Related Art

Various techniques have been proposed to counter the problem of signal propagation conditions, and to achieve data rates that are very close to the channel capacity. One of these techniques employs MIMO systems, which use antenna arrays at both the transmitter and the receiver. Wolniansky et al. have proposed the well-known MIMO scheme known as V-BLAST (see "V-BLAST: An Architecture for Realizing Very High Data Rates Over the Rich-Scattering Wireless Channel", Proc. ISSSE-98, URSI International Symposium (1998), pp. 295-300). In V-BLAST, parallel data streams are sent via the transmit antennas at the same carrier frequency. V-BLAST can achieve high spectral efficiencies without increasing the system's bandwidth or transmitted power. While MIMO systems, such as V-BLAST, can improve the system capacity greatly, it is difficult to implement antenna arrays on handheld terminals due to size, cost and hardware limitation. Moreover, V-BLAST has poor energy performance and doesn't fully exploit the available diversity. In order to overcome these problems, Space-time block code (STBC) was developed. STBC has two transmit antennas and one receive antenna that provide the same diversity order as maximal-ratio receiver combining (MRRC) with one transmit and two receive antennas. This scheme can be generalized to two transmit antennas and M receive antennas to provide a diversity order of 2M.

With the tempting advantages of V-BLAST and STBC, many researchers have attempted to combine these two schemes to result in a multilayered architecture called MLSTBC in which each layer is composed of antennas that corresponds to a specific STBC. This combined scheme arises as a solution to jointly achieve spatial multiplexing and diversity gains simultaneously. With the MLSTBC scheme, it is possible to increase the data rate while keeping a satisfactory link quality in terms of symbol error rate (SER). Beamforming has been combined with MLSTBC to produce a hybrid transmission scheme called the layered steered space-time codes (LSSTC). The addition of beamforming to MLSTBC further improves the performance of the system by focusing the energy towards one direction, where the antenna gain is increased in the direction of the desired user, while reducing the gain towards the interfering users. Nevertheless, it is still desirable to improve error performance in an LSSTC system.

Thus, a multi-configuration adaptive layered steered space-time coded (LSSTC) wireless transmission system and method solving the aforementioned problems is desired.

SUMMARY OF THE INVENTION

The multi-configuration adaptive layered steered space-time coded system utilizes Layered Steered Space-Time Codes (LSSTC), a recently proposed multiple-input multiple-output (MIMO) system that combines the benefits of vertical Bell Labs space-time (V-BLAST) scheme, space-time block codes (STBC) and beamforming for wireless transmission. The multi-configuration transmission scheme based on LSSTC and V-BLAST systems uses threshold-based decision making to change the modulation type and the MIMO transmission scheme in order to optimize the error performance. Numerical results are presented showing that the combination of beamforming, STBC, and V-BLAST has better performance than V-BLAST at high signal-to-noise ratio (SNR) range.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The multi-configuration adaptive layered steered space-time coded system 10 utilizes Layered Steered Space-Time Codes (LSSTC), a multiple-input multiple-output (MIMO) system that combines the benefits of vertical Bell Labs space-time (V-BLAST) scheme, space-time block codes (STBC) and beamforming. The multi-configuration transmission scheme based on LSSTC and V-BLAST systems uses threshold-based decision making to change the modulation type and the MIMO transmission scheme in order to optimize error performance. As will be described in detail below, the system 10, combining beamforming, STBC, and V-BLAST, has better performance than V-BLAST alone at high signal-to-noise ratio (SNR) range.

Figure 1:
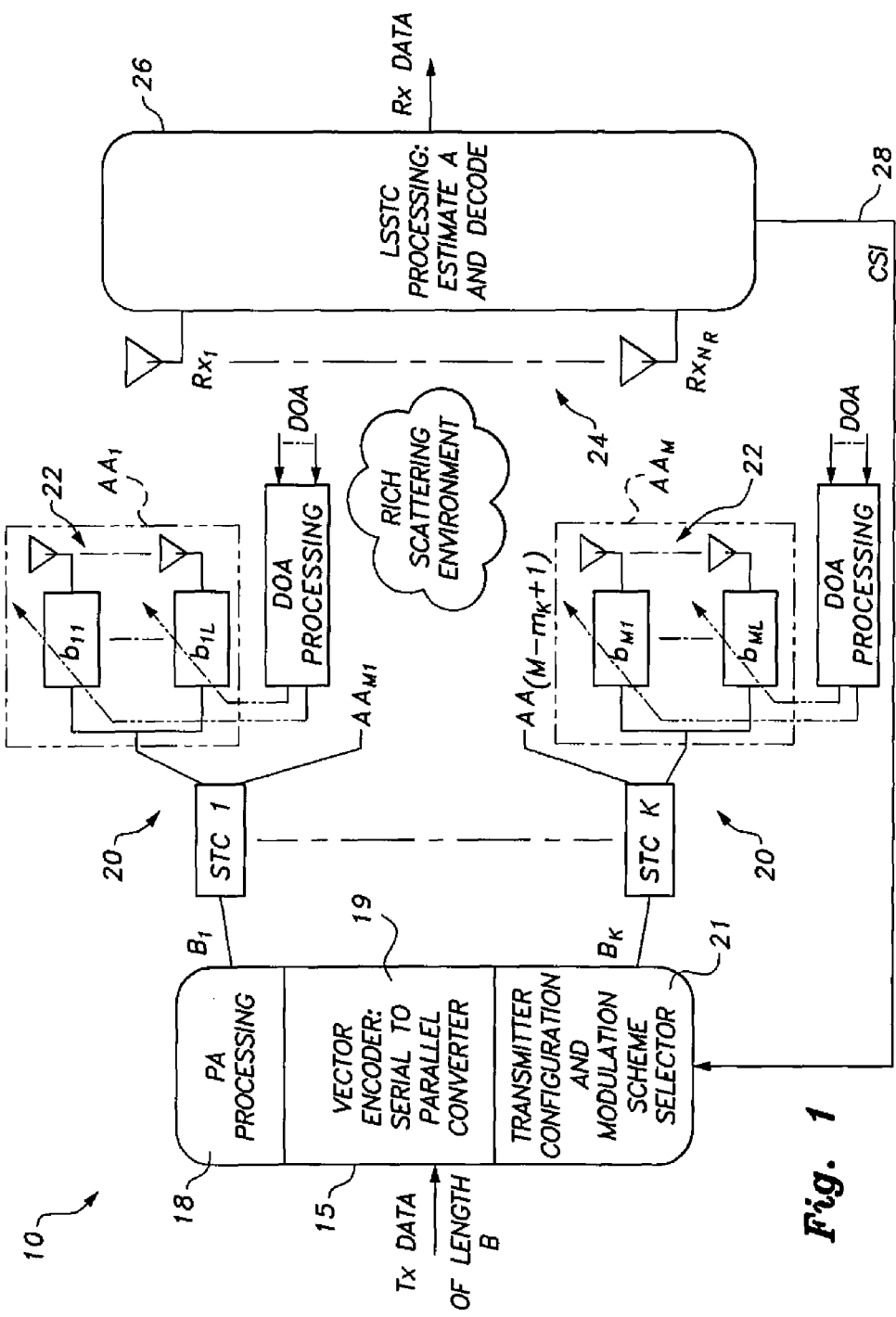
FIG. 1 is a block diagram of an LSSTC wireless transmission system for a multi-configuration adaptive layered steered space-time coded system according to the present invention.

FIG. 1 shows a block diagram of LSSTC system 10, which has $N_T$ total transmitting antennas 22 and $N_R$ receiving antennas 24 and is denoted by an $N_T \times N_R$ system. The antenna architecture shown has M transmit adaptive antenna arrays ($AA_1$-$AA_M$) spaced sufficiently far apart in order to experience independent fading, and hence achieve transmit diversity. Each of the AAs consists of L elements that are spaced at a distance of $d=\lambda/2$ to ensure that beamforming can be achieved. A block of B input information bits is sent to the LSSTC vector encoder 15 and is then serial-to-parallel converted at 19 to produce K streams (layers) of length $B_1, B_2, \ldots, B_K$, where $B_1+B_2+ \ldots +B_K=B$. Each group of $B_k$ bits, $k \in [1, \ldots, K]$, is then encoded by a component space-time encoder 20 STCk associated with $m_k$ transmit AAs, where $m_1+m_2+ \ldots +m_K=M$. The output of the $k^{th}$ STC encoder is a $m_K \times l$ codeword, $c_i$, that is sent over l time intervals. The space-time coded symbols from all layers can be written as $C=[c_1, c_2, \ldots, c_K]^T$, where C is an M×l matrix.

The coded symbols from C are then processed by corresponding beamformers, which, as shown in FIG. 1, are formed from the adaptive antenna arrays ($AA_1$-$AA_M$), and are then transmitted simultaneously over the wireless channels, which are assumed to be incorporated in a rich scattering environment. The transmitted symbols have an average power of $P_T=1$, where the average is taken across all codewords over both spatial and temporal components. For proper operation, $N_R$ should be at least equal to K. The BS prompts the user to feedback the CSI per layer via the feedback channel along with the direction of arrival (DOA) data.

The multi-configuration adaptive layered steered space-time coded system and method are on V-BLAST and LSSTC. The scheme uses the LSSTC system, and switches between the LSSTC configuration and the V-BLAST configuration (at 21), in which the number of antenna arrays per layer is set to one. A specific structure identifying the SNR threshold levels at which the scheme changes is identified. The goal of this adaptation is to minimize the SER for each SNR range.

This scheme selects the configuration and the modulation scheme in order to improve the performance. Table 1 lists the transmitter configurations and modulation schemes depending on the SNR level in the system.

TABLE 1

| SNR level (dB) | Transmitter configuration | Modulation scheme |
| --- | --- | --- |
| <6.6 | V-BLAST | QPSK |
| 6.6-9.2 | V-BLAST | 16-QAM |
| >9.2 | LSSTC | 16-QAM |

For example, if the SNR in a wireless system ranges from 6.6 dB-9.2 dB, then the performance will be better if V-BLAST configuration with 16-QAM (quadrature amplitude modulation) modulation is used, while for values greater than (9.2 dB) it is better to use LSSTC configuration with 16-QAM modulation. We have designed an adaptive system that chooses between V-BLAST and LSSTC. This can be done using an antenna array with the capability of electronically activating specific antenna elements and deactivating the remaining ones. This is done to meet the antenna separation conditions of each configuration in the multi-configuration system.

In LSSTC, there are two conditions for the antenna element separation: the AAs should be sufficiently far apart in order to experience independent fading; and beamforming elements within each antenna array should be spaced at small distance that is less than $\lambda/2$ for the sake of achieving beamforming. On the other hand, V-BLAST requires that all the antennas be spaced sufficiently far from each other.

Figure 2:
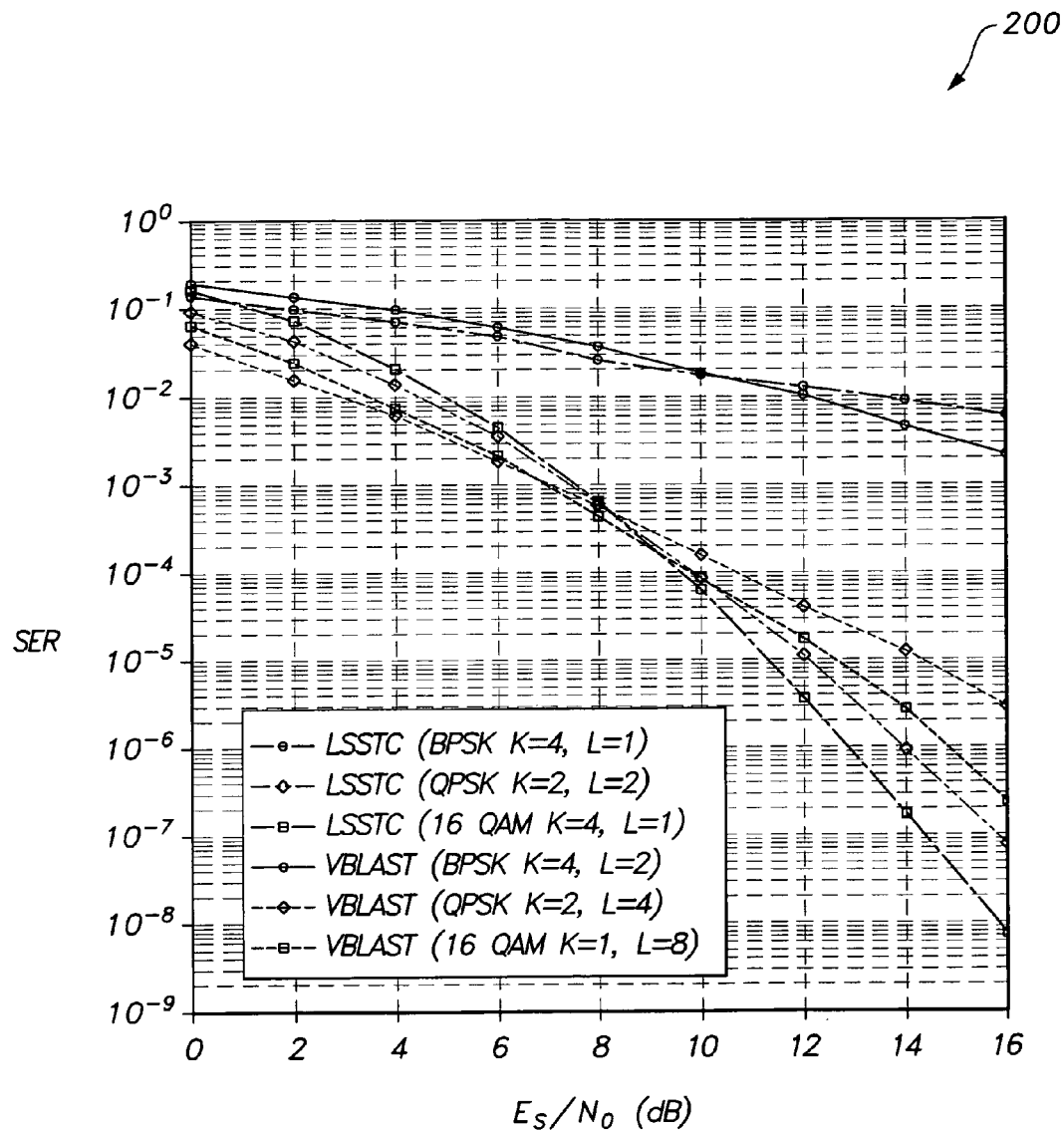
FIG. 2 is an exemplary symbol error rate (SER) plot showing a comparison of SERs for LSSTC and V-BLAST systems using different types of modulation.

A fair comparison between LSSTC and V-BLAST was conducted. This fairness was achieved by structure and spectral efficiency fairness, that is, that the total number of antennas at the transmitter NT and the number of symbols sent every time slot are the same for both systems. The plot 200 of FIG. 2 shows a comparison between LSSTC and V-BLAST in terms of the symbol error rate. The two systems use a total number of transmit antennas, $N_T=8$, and the receiver is equipped with 4 antennas employing non-ordered serial group interference cancellation (SGIC). In this comparison, we have also compared many transmitter configurations, and in each configuration a different modulation scheme is used so that the spectral efficiency would be the same for all of them, which is set to 4 bps/Hz. As shown in FIG. 2, it can be clearly seen that V-BLAST outperforms LSSTC in the low range of SNR, whereas for values of SNR that exceed 9 dB, the LSSTC outperforms V-BLAST because it has a higher diversity order resulting from using STBC, which drives the SER to decay sharply.

Figure 3:
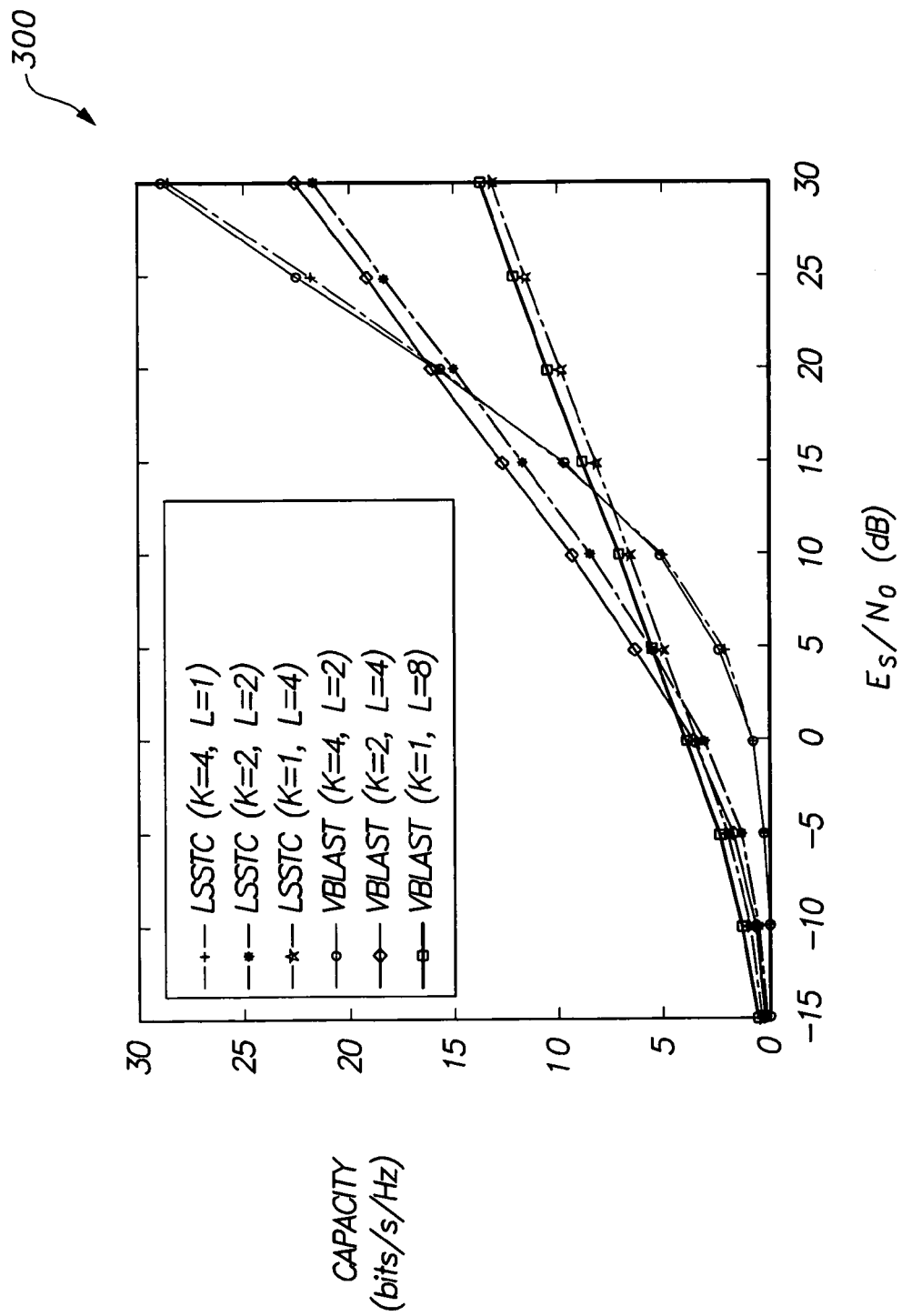
FIG. 3 is an exemplary outage or throughput capacity plot showing a comparison of LSSTC and V-BLAST systems at various combinations of layers (K) and number of antenna elements (L) per antenna array.

As shown in FIG. 3, plot 300 compares the outage capacity of LSSTC to that of V-BLAST for an 8×4 MIMO at 10% Outage probability and 15 dB average SNR. Several configurations are considered, and the capacity is plotted versus signal-to-noise ration ($E_s/N_0$). It can be seen that the capacity is approximately linearly increasing with increasing $E_s/N_0$. It is clear to see that V-BLAST outperforms LSSTC, which is actually expected, since V-BLAST is a pure spatial multiplexing scheme, unlike LSSTC where some antennas are assigned for diversity.

For the 4-layer case (K=4), it is seen that LSSTC approaches V-BLAST. One possible reason for that is that the STBC processing will tend to average the channel, and as a result, LSSTC will be less probable to fall in an outage. On the other hand, V-BLAST doesn't have such a capability. FIG. 3 shows that a multi-configuration system can be designed to maximize the capacity for all values of SNR. In the aforementioned configuration the single-layer V-BLAST system is chosen for the first range (−15 dB up to 1 dB), and for the second range (1 dB up to 20 dB) the dual-layer V-BLAST system gives the highest capacity. If the SNR lies in the last range (>20 dB), then using either LSSTC or V-BLAST with 4 layers will have approximately the same capacity. However, as shown in plot 200 of FIG. 2 the LSSTC has a lower SER in the last range. Therefore, LSSTC is better in that range.

It will be understood that the diagram in FIG. 1 depicting the LSSTC wireless transmission system is exemplary only, and that the system may be embodied in a dedicated electronic device having a microprocessor, microcontroller, digital signal processor, application specific integrated circuit, field programmable gate array, any combination of the aforementioned devices, or any other device that combines the functionality of the LSSTC wireless transmission system method onto a single chip or multiple chips programmed to carry out the method steps described herein, or may be embodied in a general purpose computer having the appropriate peripherals attached thereto and a software product stored on a computer readable media, (e.g., magnetic storage, or electromagnetic storage, or solid state, non-optical or optical storage media), that can be loaded into main memory and executed by a processing unit to carry out the functionality of the apparatus and steps of the method described herein.

This multi-configuration adaptive layered steered space-time coded system can be added to the existing and evolving wireless communication systems that employ MIMO, such as the long-term evolution (LTE) or WiMAX, seamlessly and with quite low cost. This can be used to optimize performance by selecting between the V-BLAST configuration and the LSSTC configuration with changing the modulation scheme. As seen from the numerical results, this system and method can result in a huge drop in the SER at a much higher bandwidth efficiency. The proposed adaptive system can result in a SER as small as $10^{-8}$ at an SNR of 16 dB. This means that the system will be highly efficient and reliable.

It is to be understood that the present invention is not limited to the embodiment described above, but encompasses any and all embodiments within the scope of the following claims.

We claim:

1. A multi-configuration adaptive method applied by a transceiver in a layered steered space-time coded (LSSTC) wireless transmission system, the method comprising the steps of:

receiving channel state information (CSI) and direction of arrival data (DOA) as a feedback signal at the transceiver; and automatically switching between a vertical Bell Labs space-time (V-BLAST) antenna array configuration and an LSSTC antenna array configuration and switching modulation mode based on signal-to-noise ratio (SNR) thresholds compared with the feedback signal in the wireless transmission system.

2. The multi-configuration adaptive method according to claim 1, wherein said switching step further comprises the steps of:

switching the configuration V-BLAST and the modulation mode to QPSK (quadrature phase shift keying) if the SNR is below a first, lowest threshold level;

switching the configuration to V-BLAST and the modulation mode to 16-QAM (16-state quadrature amplitude modulation) if the SNR is inclusively between the first, lowest threshold level and a second, higher threshold level; and switching the configuration to LSSTC and the modulation mode to 16-QAM if the SNR is greater than the second threshold level.

3. The multi-configuration adaptive method according to claim 2, wherein the first, lowest threshold level is set to 6.6 dB and said second, highest threshold level is set to 9.2 dB.

* * * * *